Feb. 23, 1954 K. G. McKAY 2,670,441

ALPHA PARTICLE COUNTER

Filed Sept. 7, 1949

INVENTOR
K.G. Mc KAY
BY
A. J. Guenther
ATTORNEY

Patented Feb. 23, 1954 2,670,441

UNITED STATES PATENT OFFICE 2,670,441

ALPHA PARTICLE COUNTER

Kenneth G. McKay, Summit, N. J., assignor to Bell Telephone Laboratories, Incorporated, New York, N. Y., a corporation of New York Application September 7, 1949, Serial No. 114,303

1 Claim. (Cl. 250—83.3)

This invention relates to apparatus for and a method of detecting radiation resulting from atomic disintegration and more particularly to devices for detecting and counting high energy particles such as alpha particles.

General objects of this invention are to simplify the structure and to improve the performance characteristics of detectors and counters of ionizing particles.

A more specific object of this invention is to enhance the performance of alpha particle counters.

The invention is predicated in part upon the discovery that germanium has unique properties rendering it highly advantageous for use in the detection and counting of high energy ionizing particles. More specifically, it has been found that under certain conditions a rectifying junction in or to a body of germanium provides a region which is markedly sensitive to ionizing particles, highly discriminatory against low energy particles, sharply selective spatially and possesses homogeneous and reproducible performance characteristics.

In one illustrative embodiment of this invention, an alpha particle detector and counter comprises a body of germanium, for example of N conductivity type, having a substantially ohmic connection to one face thereof and a highly non-ohmic connection, for example, a point contact, to the opposite face. The non-ohmic connection forms a rectifying junction with the body, the high resistance of this junction being ascribable to the formation of a thin barrier layer in the body immediately under and adjacent the connection. The barrier layer is photosensitive and has resistance and capacitance providing a definite time constant as will be developed hereinafter.

In semiconductors such as germanium, conduction occurs by the flow of electrons or holes or both. An electric field applied in the reverse direction across the barrier described above tends to attract the holes toward the non-ohmic connection and electrons toward the ohmic connection. Thus, if holes and electrons are produced in the vicinity of the barrier a current flow between the ohmic and non-ohmic connections may obtain.

It has been found that alpha particles incident upon the body and which penetrate the barrier produce pulses in an output circuit connected between the ohmic and non-ohmic connections. This may be explained on the basis that the alpha particles produce holes and electrons in equal numbers, many hole-electron pairs for each particle, in the body and in proximity to the barrier. Under the influence of the applied reverse electric field, the holes flow to the non-ohmic connection and the electrons to the ohmic connection. Thus, bombardment by an alpha particle can be considered as equivalent to the production of a current impulse across the barrier layer.

Only the region in the immediate vicinity of the non-ohmic connection is sensitive to bombardment by ionizing particles so that high spatial resolution is realizable. The response is very rapid so that high speed counting of the incident particles may be obtained. Furthermore, the device is highly discriminatory against low energy radiation such as beta and gamma particles. In addition, it has been found that the germanium structure is such that it is not subject to trapping of charge carriers such that space charge effects are produced. Hence, homogeneous and reproducible performance characteristics are realized.

The invention and the various features thereof will be more clearly and fully understood from the following detailed description with reference to the accompanying drawing in which:

Fig. 6 is a perspective view of another germanium unit which may be utilized in practicing this invention.

Figure 1:
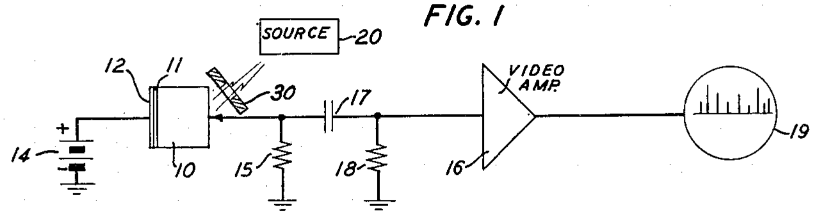
Fig. 1 is a schematic showing the principal elements and the cooperative relation thereof in an ionizing particle detector or counter illustrative of one embodiment of this invention.

Referring now to the drawing, the device illustrated in Fig. 1 comprises a body or wafer 10 of germanium having on one face thereof an ohmic connection 11 which is joined to a metallic base plate 12, and having bearing against the opposite face a point contact 13, for example of Phosphor bronze. In a typical construction, the body 10 may be of high back voltage N conductivity type germanium produced, for example, in the manner described in the application, Serial No. 638,351, filed December 29, 1945, of J. H. Scaff and H. C. Theuerer. The face of the body to which the ohmic connection 11 is made may be sandblasted and the connection 11 may be constituted by an evaporated gold film which is soldered to a copper base plate 12. The body 10 in a typical construction may be of the order of 0.05 inch square and 0.01 inch thick.

An electric field is impressed between the ohmic connection 11 and the point contact 13 by a suitable source 14, the source being connected to the contact 13 through a resistor 15. The point contact 13 is connected also to the input of a high frequency amplifier 16 by way of a series condenser 17 and a resistor 18. The output of the amplifier 16 is supplied to an indicating or counting device 19 which, in the form illustrated, is a cathode-ray oscillograph.

In use, the germanium unit 10 is exposed to radiations, indicated as emanating from a source 20. Under certain conditions which will be developed in detail hereinafter, each alpha particle emanating from the source 20 and incident upon the body 10 in the vicinity of the point contact 13 produces a pulse supplied to the input of the amplifier. Each such pulse is portrayed upon the screen of the cathode-ray device.

The principles involved in the operation of the device and the conditions requisite for the counting of incident particles will be understood from the following considerations. The junction between the point contact 13 and the body is rectifying, the impedance thereof being high when the N type body is positive with respect to the contact and low when the body is negative with respect to the contact. The high impedance in the reverse direction is due to a barrier layer immediately below the point contact. This layer, which is extremely thin, specifically of the order of $10^{-4}$ centimeters thick, possesses resistance and capacitance both of which are functions of the voltage applied across the layer. Qualitatively, the variation of the barrier impedance with the voltage obtaining across the germanium body is as follows: As the voltage is increased in the forward direction, that is with the germanium negative with respect to the contact, the barrier resistance decreases and the capacitance increases. For an increase in bias in the reverse direction, that is with the germanium positive with respect to the contact, the barrier resistance increases and the capacitance decreases. For example, in typical devices, the barrier capacitance for one volt bias in the reverse direction is of the order of one per cent of the capacitance for zero bias.

Figure 2:
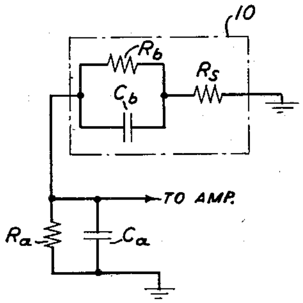
Fig. 2 depicts the equivalent circuit of the germanium body and the amplifier included in the device illustrated in Fig. 2.
Figure 3:
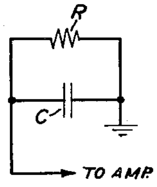
Fig. 3 is a practical equivalent of the circuit of Fig. 2 for certain relations of the parameters as described hereinafter.

The equivalent circuit of the germanium unit and the input to the amplifier 16 is depicted in Fig. 2. In this figure $R_b$ and $C_b$ are the resistance and capacitance respectively of the barrier, $R_s$ is the series resistance of the body of germanium and $R_a$ and $C_a$ are the resistance and capacitance respectively composing the input impedance of the amplifier. The series resistance $R_s$ is in general very small with respect to the barrier resistance $R_b$ and may be neglected for practical purposes. The circuit of Fig. 2 then reduces to the simple parallel RC circuit illustrated in Fig. 3 wherein $$C={}_a+C_b \qquad (1)$$

$$R=\frac{R_bR_d}{R_b+R_d} \qquad (2)$$

As has been noted heretofore, in a semiconductive body such as germanium, conduction in the interior may be by holes or electrons or both. A high energy ionizing particle, for example an alpha particle, incident upon and penetrating the barrier layer results in the liberation of electrons and holes in equal numbers. Because of the polarity of the bias source 14 holes will be attracted to the point contact 13 and electrons to the ohmic connection 11. Thus, incidence of an alpha particle upon the barrier produces an impulse current across the barrier layer. The peak voltage produced across this layer by alpha particle bombardment is given by the expression $$v=\frac{Q}{C} \qquad (3)$$

wherein $v$ is the peak voltage and Q is the effective charge delivered to the circuit capacitance. Q may be expressed as $$Q=\frac{ne\sum V_1}{V} \qquad (4)$$

in which $n$ is the total number of charge carriers produced by the alpha particle, $e$ is the electron charge, $V_1$ is the voltage drop through which each carrier passes and V is the total voltage drop in the circuit. The peak voltage $v$ will decay with time at a rate determined by the product RC.

In order that a pulse due to an alpha particle may be counted, it is necessary that the peak voltage $v$ be well above the noise level of the amplifier 16 together with the noise contributed by the input circuit to the amplifier and, further, that the rise time of the amplifier be less than the product RC in order that the amplifier can respond before the pulse decays.

The noise level of the amplifier and the input circuit therefor, neglecting the noise due to the barrier itself, can be determined in ways well known in the art. With respect to the noise due to the barrier, the noise power per cycle varies inversely with frequency and, in general, increases with increasing voltage in the reverse direction. Thus, it is desirable that the low frequency noise components be not transmitted to the amplifier and further that the bias on the germanium unit be as low as practicable consistent with adequate counting performance. Exclusion of the low frequency noise components may be affected by correlation of the capacitance 17 and resistance 18. For example, in a typical case, a resistance 18 of 10,000 ohms and a capacitance 17 of 100 micromicrofarads, providing a low frequency cut-off of 100 kilocycles have been found satisfactory. The resistance 15 should be very large in comparison to resistance 18, whereby it is effectively shunted by the latter at high frequencies. In the typical case above referred to, a resistance 15 of about 120,000 ohms has been found satisfactory.

As has been pointed out hereinabove, the peak voltage $v$ varies inversely with the capacitance C. A component of the capacitance C is that, $C_b$, of the barrier. This component, at zero bias, in germanium is, to within an order of magnitude, about 0.1 mf./cm.$^2$ and is much smaller, as heretofore indicated, for small reverse biases. Thus, by correlation of the barrier area and the reverse bias, a desirably low value of $C_b$ can be realized.

The parameter $C_b$ enters also into the determination of the time constant determined by the RC product which, as noted heretofore, should be long in comparison to the amplifier rise time. The time constant can be increased by increasing the input capacitance $C_a$ of the amplifier but this, in general, is undesirable beyond limits inasmuch as it would reduce the available peak voltage. Advantageously, therefore, the two capacitances $C_a$ and $C_b$ are correlated so that $C_a$ is the larger of the two, for example such that $C_b$ is negligible in comparison to $C_a$.

In a typical case found satisfactory for the counting of alpha particles, $C_a$ was 17 micromicrofarads and $C_b$ was about 1 micromicrofarad or less. The barrier resistance was greater than 100,000 ohms for all bias values greater than 0.5 volt. This provided a pulse relaxation time, set primarily by the product $C_aR_2$, of substantially 0.17 microsecond which was adequate for an amplifier 16 having a rise time of 0.02 microsecond.

Figure 4:
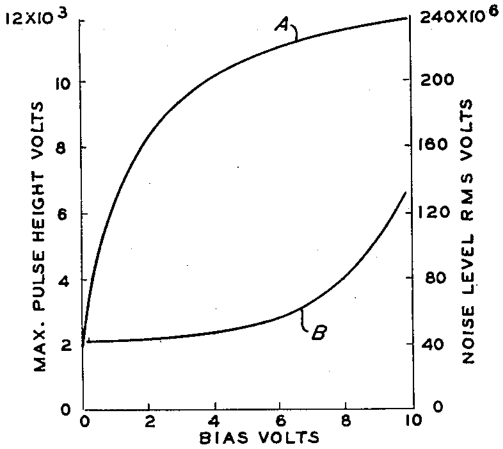
Fig. 4 is a graph illustrating typical operating characteristics of the device shown in Fig. 1.

Performance characteristics of a device having the parameters given hereinabove and exposed to alpha particles emanating from a polonium source in proximity to the junction between the contact 13 and body 10 are depicted in Fig. 4 wherein curve A shows the relation between peak pulse height and reverse bias and curve B shows the relation between noise level of the germanium unit and the reverse bias. The pulse height approaches a maximum for a reverse bias of about 3 volts. In the particular construction utilized, at a reverse bias of 5 volts, the noise level of the unit began to exceed that of the normal amplifier and input thermal noise.

The pulse height distribution is irregular, as indicated by the pips as portrayed on the screen of the cathode-ray device 19 in Fig. 1. This follows from the fact that many of the alpha particles emanating from the uncollimated source are incident upon the barrier region at areas where the carriers, i. e., electron-hole pairs, that can be recorded are few.

It will be appreciated that the device enables detection and counting of alpha particles, or other particles of comparable energy and specific ionization. It has both a fast rise and fast recovery time and, thus, is particularly advantageous for high speed counting. It has been found that the device is highly discriminatory against relatively low energy particles such as beta and gamma radiation. Moreover, only the area in immediate proximity to the junction between the point contact and body is responsive so that high spatial selectivity obtains and the device, thus, enables accurate angular distribution measurements of alpha particles and others of comparable energy. A suitable collimating element, indicated at 30 in Figs. 1 and 5 may be provided for directing particles within a desired space angle against the barrier layer.

Figure 5:
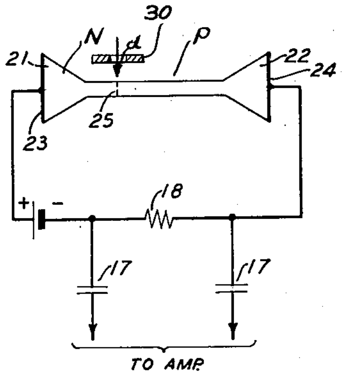
Fig. 5 is a diagram showing another form of germanium unit which may be utilized in detectors and counters constructed in accordance with this invention.
Figure 5:
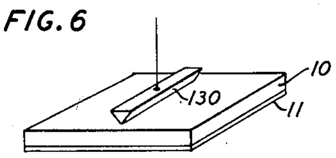

In the embodiment of the invention illustrated in Fig. 5, the germanium body 100 comprises a filamentary portion 20, for example 0.01 inch by 0.01 inch, and enlarged end portions 21 and 22 having ohmic connections 23 and 24, respectively, thereto. The body is composed of two zones of opposite conductivity type, P and N as indicated in the figure, meeting at a junction or barrier 25. The body may be fabricated in one way as described in detail in the application, Serial No. 50,896, filed September 24, 1948, of G. L. Pearson. A bias in the reverse direction across the barrier is produced by the source 14. The barrier is responsive to ionizing particles, indicated by the arrow alpha, incident upon the body on and in the immediate vicinity of the barrier.

A larger sensitive or responsive area in the germanium unit may be advantageous in certain applications. Such an area can be realized by the construction illustrated in Fig. 6 wherein the rectifying contact 130 is wedge-shaped and has a knife edge bearing against the face of the germanium body 10.

Although specific embodiments of the invention have been shown and described it will be understood that they are but illustrative and that various modifications may be made therein without departing from the scope and spirit of the invention.

What is claimed is:

An alpha particle detector comprising a wafer of N conductivity type germanium, a point contact bearing against one face of said body, a substantially ohmic connection to the opposite face of said body, a source connected between said contact and connection for establishing a biasing field of the order of two volts in the reverse direction across the barrier layer below said contact, and an indicating circuit including a high frequency amplifier having its input circuit connected between said contact and said connection, the capacitance of said input circuit being very large in comparison with the capacitance of said barrier layer.

KENNETH G. McKAY.

References Cited in the file of this patent

UNITED STATES PATENTS

| Number | Name | Date |
|---|---|---|
| 2,094,318 | Failla | Sept. 28, 1937 |
| 2,502,479 | Pearson et al. | Apr. 4, 1950 |
| 2,502,488 | Shockley | Apr. 4, 1950 |
| 2,504,628 | Benzer | Apr. 18, 1950 |
| 2,537,388 | Wooldridge | Jan. 9, 1951 |

OTHER REFERENCES

Germanium Crystal Diodes, Electronics, February 1946, pp. 118–123.

Germanium Rectifier, Proceedings of the National Academy of Sciences, vol. 11, 1925, pp. 743–745.

Electron & Nuclear Counters, Korff, Published by Van Nostrand Co. Inc., New York 1946, pp. 176–178.

Pensak, "Physical Review," February 1, 1949, pp. 472–478.